2,776,674

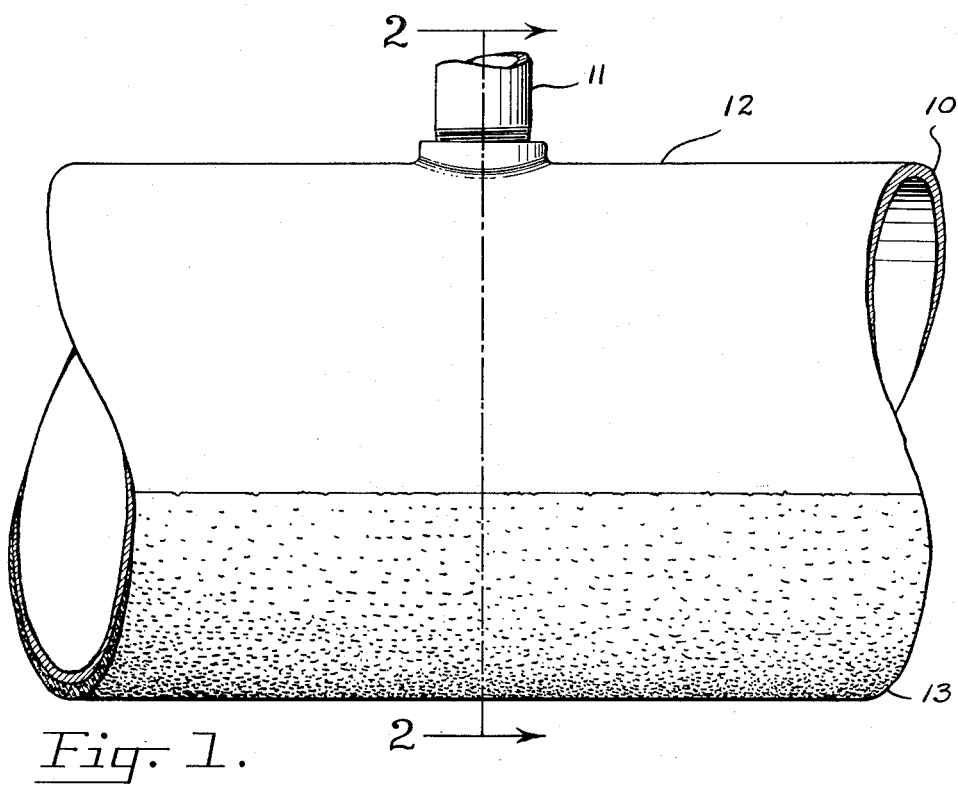
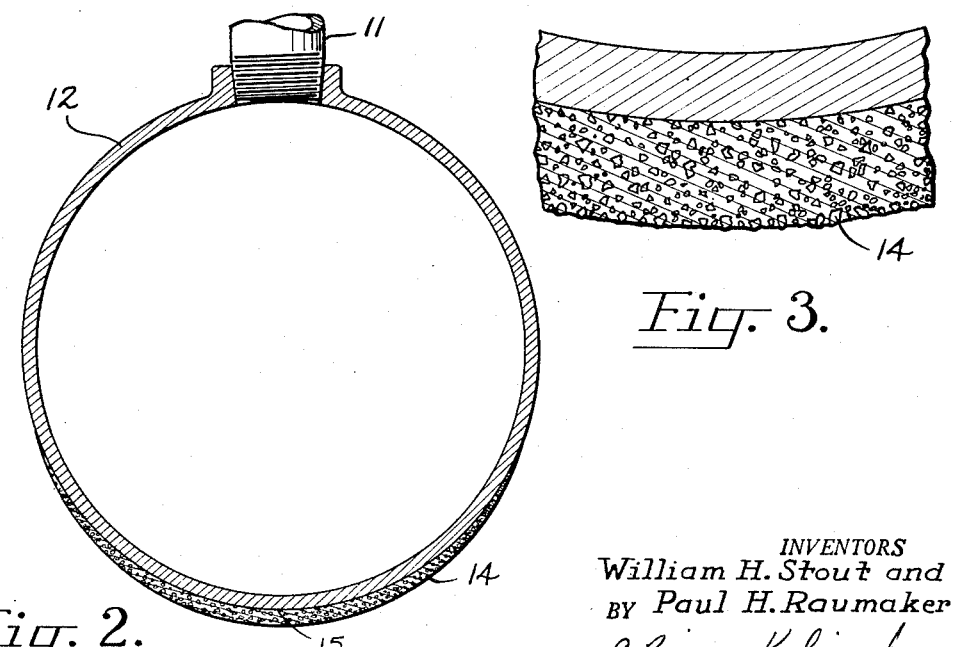
Fig. 1.
Fig. 2.
Fig. 3.
INVENTORS
William H. Stout and
Paul H. Raumaker United States Patent Office 2,776,674
Patented Jan. 8, 1957

WEAR-RESISTING COATING FOR PIPES AND THE LIKE

William H. Stout and Paul H. Raumaker, Portland, Oreg.; said Raumaker assignor to said Stout Application August 3, 1953, Serial No. 371,930

1 Claim. (Cl. 138—68)

This invention relates to pipes or conduits and more particularly to an outside coating or shoe which permits dragging a pipe or the like along the surface of the ground without damaging the pipe.

In certain instances it is necessary to move relatively long lengths of pipe from one position to another. A good example of one such instance is in portable sprinkler irrigation systems. While the present invention will, by way of example, be described with respect to pipe employed for portable irrigation, where it has been found to be eminently satisfactory, it should be understood that the invention can be utilized for other types of conduits.

In a commercial sprinkler irrigation system of the type used to irrigate a large cultivated field there are provided certain fixed water mains extending into the field. These mains are adapted to have connected at different positions along their lengths a plurality of lateral sprinkler pipes which are portable. The lateral pipes may be moved from one position to another along the main and provide irrigation for the entire field. Such an arrangement is necessary because a fixed irrigation system covering a large field is undesirable for several reasons, not the least of which would be the prohibitive cost. The lateral pipes are often one-quarter of a mile in length, and the movement of these pipes from one position to another along the water main has been a problem in the irrigation business. It will be appreciated that the weight of such a pipe is considerable and therefore these pipes are usually made from as light weight material as possible, such as aluminum and plastic. Heretofore lateral pipes have been mounted on some sort of conveying mechanism; e. g., wheeled carriage, rollers, runners, skids or some other mechanical contrivance, which would raise the pipe sufficiently from the ground to permit it to be pulled from one position to another.

We are also well aware of the many prior art suggestions for protecting pipes from the elements, corrosion, etc., by completely covering a pipe with a protective coating of asphalt, preservative gums, or other materials. However, the present invention is not for a coating which in function or construction is similar to these known coatings.

The object of the present invention is to provide a simple and inexpensive means which will facilitate the transportation of portable pipe from one position to another.

According to a feature of our invention, a pipe may be moved without damage simply by dragging it along the ground.

According to another feature of the invention, even though a pipe is dragged along rough ground and rolled from side to side, it will tend to come to rest right side up with the sprinkler heads upright.

According to still another feature of our invention, the weight of the pipe will be substantially less than the overall weight of similar pipes heretofore known.

According to still another feature the pipe will make its own track when being dragged, and can be dragged into position relatively easily.

The object and features of the invention are accomplished by means of applying a shoe or protective coating of wear-resisting material to the bottom portions of the pipe which come in contact with the ground. The coating may be applied to the pipe in any desired thickness and it will protect the pipe from abrasion, rocks and other foreign matter which would damage a pipe, particularly one of lightweight material, as it is dragged along rough ground.

These and other features of the invention will be explained with respect to the following drawings, in which:

Fig. 1 is a side elevation of a section of the pipe with the wear-resisting coating thereon;

Fig. 2 is a cross section on the line 2—2 of Fig. 1; and

Fig. 3 is a magnified cross section of a portion of pipe.

10 is a portion of a section of pipe which may be of iron, steel, aluminum, plastic or any other material out of which pipes are commonly made. In the present example the pipe would in all probabilities be made of aluminum or plastic for which our invention is well suited. Risers 11 are provided at fixed intervals along top 12 of pipe 10. Risers 11 have mounted at their upper ends sprinkler heads (not shown) through which water is dispersed to the surrounding area. Along the bottom 13 of pipe 10 there is provided a shoe, layer or protective coating 14. Coating 14 may be made up of any wear-resisting material which lends itself to being firmly secured to the outside surface of the pipe by some binding or adhesive means. There are many suitable types of wear-resisting materials which lend themselves to this construction. For instance, most tough granular materials in relatively dense, particle form such as sand have been found to be eminently satisfactory. The granules may vary in size from that of fine sand to that of crushed rock, requiring at least a ¼" screen to pass therethrough. We have found that the bottom portions of the pipe which normally contact the ground during movement of the pipe amount to approximately one-third of the circumference of the pipe and the coating should be applied to this area. However, it is possible to apply the coating to substantially more or less than this area without materially changing the result. All that is necessary is to protect those portions of a pipe which contact the ground when the pipe is dragged.

Coating 14 may be tapered to have a crescent-like cross section, as seen in Fig. 2, so that the thickness of the coating is greater at the lowermost portion 15 of the pipe which is diametrically opposite riser 11. The added thickness of the coating makes the pipe bottom heavy so that the pipe will tend to come to rest in a position with the riser and sprinkler heads upright. This self-aligning feature of the pipe is useful after dragging the pipe across rough ground which may have rolled the pipe from side to side. The thickness of the coating will vary, depending on the type of terrain on which the pipe will be used. We have found that in a Ladino clover field a ⅛" coating at its thickest was satisfactory for a 5" pipe.

Coating 14 may conveniently be applied to a length of aluminum pipe in the following manner: Paint the bottom portions of the pipe with a suitable adhesive such as a solution of Epon (manufactured by Shell Chemical Corp.), then roll the pipe back and forth in sand until it will no longer pick up sand, and finally place the pipe in an oven to cure. The pipe is now ready for use and when it is desired to move the pipe, after uncoupling from the water main, one end is hitched to a tractor or other suitable conveyance and the pipe is pulled along the ground to its new position. Coating 14 protects the pipe from rocks and stones and general wear against the ground. Mud and dirt also tend to stick to the surface of the coating thereby providing additional protection.

It will be appreciated that the invention eliminates the necessity of a carriage or other means for transporting pipe about a field. The protective coating is an integral part of the pipe and serves as a means for permitting the pipe to be transported from one position to another simply by being dragged.

We claim:

As an article of manufacture, a portable irrigation pipe having water dispensing means along an outer longitudinal portion of said pipe and opposite on the other side a longitudinal portion adapted for contacting and dragging on the ground, said opposite portion characterized by a longitudinal wear-resistant shoe having a crescent-like cross section integral with the pipe, said integral shoe comprising a cured adhesive having sand embedded at least at the surface portion thereof and covering approximately one-third of the pipe circumference, the thickest portion of the cross section being substantially diametrically opposite the water dispensing means.

References Cited in the file of this patent
UNITED STATES PATENTS

| | | |
|---|---|---|
| 158,217 | Clark et al. | Sept. 25, 1866 |
| 475,454 | Lacy | May 24, 1892 |
| 1,959,078 | Eddleman | May 15, 1934 |
| 2,141,658 | Melton et al. | Dec. 27, 1938 |
| 2,314,525 | Summers | Mar. 23, 1943 |